(12) United States Patent
Grootaert et al.

(10) Patent No.: US 6,812,310 B2
(45) Date of Patent: Nov. 2, 2004

(54) PROCESS FOR PRODUCING FLUOROPOLYMERS HAVING A REDUCED AMOUNT OF POLAR END GROUPS

(75) Inventors: Werner M. A. Grootaert, Oakdale, MN (US); Klaus Hintzer, Kastl (DE); Bernhard Hirsch, Burgkirchen (DE); Harald Kaspar, Burgkirchen (DE); Gernot Löhr, Burgkirchen (DE); Franz März, Burgkirchen (DE); Guy Van Gool, Melsele (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/452,523

(22) Filed: Jun. 2, 2003

(65) Prior Publication Data

US 2003/0236370 A1 Dec. 25, 2003

Related U.S. Application Data

(60) Provisional application No. 60/390,488, filed on Jun. 21, 2002.

(51) Int. Cl.$^7$ .............................................. C08F 114/18
(52) U.S. Cl. ...................... 526/253; 526/247; 526/249; 526/250; 526/255
(58) Field of Search ................................ 526/253, 250, 526/249, 255, 247

(56) References Cited

U.S. PATENT DOCUMENTS

| | | | |
|---|---|---|---|
| 2,567,011 A | 9/1951 | Diesslin et al. | |
| 2,732,398 A | 1/1956 | Brice et al. | |
| 2,809,990 A | 10/1957 | Brown | |
| 3,876,654 A | 4/1975 | Pattison | |
| 4,000,356 A | 12/1976 | Weisgerber et al. | |
| 4,214,060 A | 7/1980 | Apotheker et al. | |
| 4,233,421 A | 11/1980 | Worm | |
| 4,501,869 A | 2/1985 | Tatemoto et al. | |
| 4,745,165 A | 5/1988 | Arcella et al. | |
| 4,831,085 A | 5/1989 | Okabe et al. | |
| 4,912,171 A | 3/1990 | Grootaert et al. | |
| 5,006,624 A * | 4/1991 | Schmidt et al. | 526/243 |
| 5,086,123 A | 2/1992 | Guenthner et al. | |
| 5,262,490 A | 11/1993 | Kolb et al. | |
| 5,285,002 A | 2/1994 | Grootaert | |
| 5,565,512 A | 10/1996 | Saito et al. | |
| 5,591,804 A | 1/1997 | Coggio et al. | |
| 5,668,221 A | 9/1997 | Saito et al. | |
| 5,677,389 A | 10/1997 | Logothetis et al. | |
| 5,852,149 A * | 12/1998 | Abusleme et al. | 526/247 |
| 5,929,169 A | 7/1999 | Jing et al. | |
| 6,211,319 B1 | 4/2001 | Schmiegel | |
| 6,281,296 B1 | 8/2001 | MacLachlan et al. | |
| 6,489,420 B1 * | 12/2002 | Duchesne et al. | 526/255 |
| 6,664,338 B2 * | 12/2003 | Staccione et al. | 525/326.3 |

FOREIGN PATENT DOCUMENTS

| | | |
|---|---|---|
| BE | 1 012 395 | 10/2000 |
| EP | 0 219 065 A2 | 4/1987 |
| EP | 0 320 940 A2 | 6/1989 |
| EP | 0 661 304 A1 | 7/1995 |
| EP | 0 761 735 A1 | 3/1997 |
| EP | 0 769 521 A1 | 4/1997 |
| EP | 0 784 064 A1 | 7/1997 |
| WO | WO 96/24622 | 8/1996 |
| WO | WO 97/17381 | 5/1997 |
| WO | WO 02/44265 | 6/2002 |

OTHER PUBLICATIONS

*Encyclopedia Of Polymer Science And Engineering*, Second Edition, V. 15, "Silicones", pp. 204–308, John Wiley & Sons, 1989.
*Journal of American Chemical Society*, V. 116, pp. 4521–4522, 1994.

* cited by examiner

*Primary Examiner*—David W. Wu
*Assistant Examiner*—Henry S Hu
(74) *Attorney, Agent, or Firm*—Brian E. Szymanski

(57) ABSTRACT

A fluoropolymer having a reduced amount of polar end groups. The fluoropolymer is produced by free radical polymerization of fluorinated monomers and the initiation of the polymerization is carried out in the presence of a chloride salt. Polar end groups include hydroxy groups and ionized or ionizable end groups. Examples of ionized or ionizable end groups include acid groups and salts thereof such as sulfonic acid and salts thereof, —$CH_2$—$OSO_3H$ groups, sulfates and carbonyl containing end groups such as carboxylic and carboxylate groups. Due to the presence of chloride salt at the initiation of the free radical polymerization, $CF_2Cl$ end groups are formed instead of the polar end groups. As a result, a fluoropolymer is obtained that has improved processibility and heat resistance.

11 Claims, No Drawings

PROCESS FOR PRODUCING FLUOROPOLYMERS HAVING A REDUCED AMOUNT OF POLAR END GROUPS

CROSS REFERENCE TO RELATED APPLICATION

This application claims priority to U.S. Provisional Patent Application No. 60/390,488, filed Jun. 21, 2002, herein incorporated by reference in its entirety.

FIELD OF THE INVENTION

The present invention relates to a process for producing a fluoropolymer that has a reduced amount of polar end groups, in particular ionized or ionizable end groups such as sulfonic acid groups or carbonyl containing end groups such as carboxylic acid groups and carboxylate groups. In particular, the invention relates to the use of a chloride salt in the initiation of the free radical polymerization of fluorinated monomers to produce a fluoropolymer that has an improved processibility and/or heat resistance. The invention further relates to fluoropolymers that can be obtained with the process.

BACKGROUND OF THE INVENTION

Fluoropolymers have, depending on the monomers used and the applied initiator systems during the radical polymerization, different polar end groups; for example polar end groups quite often present in fluoropolymers are: $-CH_2OH$, $-COO^-$, $-CH_2-O-SO_3^-$, $-SO_3^-$. These polar end groups are not desired, because they can undergo further reactions (e.g. decarboxylation) during processing or heat treatment and are a cause for processing difficulties and finally also for discolorations.

For example, U.S. Pat. No. 6,211,319 describes perfluoroelastomers that have carbonyl containing end groups. It is disclosed in this patent that the presence of these carbonyl containing end groups, while providing desirable cure properties, may present problems in the processing of these polymers. In particular, the presence of these groups may cause the polymer to become too viscous. Accordingly, U.S. Pat. No. 6,211,319 proposes to reduce the number of carbonyl containing end groups by a decarboxylation which involves a heat treatment. However, this process has the disadvantage that an additional process step is needed which additionally involves supplying energy. Accordingly, such a process increases the cost of manufacturing and causes inconveniences in the manufacturing.

Additionally, the presence of carboxylic or carboxylate containing end groups generally diminishes beneficial properties of the fluoropolymer including thermal properties such as heat resistance. Methods have therefore been developed in the prior art to reduce the amount of these groups. Such methods include for example post fluorination as well as the use of special initiators such as sulfinates as disclosed in U.S. Pat. No. 5,285,002. However, these methods have disadvantages such as increasing cost and reducing convenience of manufacturing.

It is therefore desired to find a further method of reducing the content of polar end groups and to produce fluoropolymers that have improved processibility and/or thermal properties including improved heat resistance. Preferably, the method of making these polymers allows for a cost effective and convenient manufacturing.

SUMMARY IN THE INVENTION

In accordance with the present invention, it was found that when the fluoropolymer is produced by free radical polymerization of fluorinated monomers and the initiation of the polymerization is carried out in the presence of a chloride salt, a fluoropolymer results that has a reduced amount of polar end groups. Polar end groups include hydroxy groups and ionized or ionizable end groups. Examples of ionized or ionizable end groups include acid groups and salts thereof such as sulfonic acid and salts thereof, $-CH_2-OSO_3H$ groups, sulfates and carbonyl containing end groups such as carboxylic and carboxylate groups. Due to the presence of chloride salt at the initiation of the free radical polymerization, $CF_2Cl$ end groups are formed instead of the polar end groups. As a result, a fluoropolymer is obtained that has improved processibility and heat resistance. By the term "fluoropolymer" in connection with this invention is meant a polymer that has a fluorinated backbone, i.e. a partially or fully fluorinated backbone.

In accordance with one aspect of the present invention, the ratio of the amount of chloride salt to initiator is selected such that the amount of polar end groups in the resulting fluoropolymer is at least 10% less, preferably at least 15% less and most preferably at least 20% less compared to a similar fluoropolymer produced without the presence of a chloride salt. By the term "similar fluoropolymer" in this connection is meant that the fluoropolymer has approximately, i.e. within experimental error, the same chemical constitution and about the same molecular weight. The amount of polar end groups and the reduction thereof can be measured with common analytical methods including for example fourier transform infrared spectroscopy, NMR and titration methods.

An additional advantageous property of the obtained fluoropolymer is that due to the presence of the $CF_2Cl$ end groups, the fluoropolymer has improved bonding properties to other substrates including elastomeric layers such as silicone rubbers when bonded to these substrates in the presence of an organic compound having one or more hydride functions MH wherein M is selected from the group consisting of Si, Ge, Sn and Pb. This compound can be present in the fluoropolymer composition or can be present in a layer of the substrate. Also, by including the organic compound in the fluoropolymer that can be obtained with the process of this invention, the fluoropolymer can be cured using a peroxide cure system.

The use of sodium chloride or ammonium chloride in the free radical polymerization is disclosed in EP 320 940. However, the latter publication does not appreciate that the amount of polar end groups can be reduced by initiating the polymerization in the presence of chloride salt, nor does the publication appreciate the improved processibility and/or heat resistance of the fluoropolymer that results. Rather, this EP patent application teaches the use of a certain amount of cations, which may derive from a chloride salt but which may also derive from another salt, to improve the emulsion copolymerization of certain liquid vinyl ether monomers.

According to a further aspect of the present invention, there is also provided a fluoropolymer comprising $CF_2Cl$ end groups and that is free of acid groups and salts thereof or that contains said acid groups and their salts in an amount of not more than 0.1 milli equivalents NaOH per gram of fluoropolymer, with the proviso that when said fluoropolymer is a terpolymer of tetrafluoroethylene, hexafluoropropylene and $C_3F_7[(CF_2)_3O]_2CF=CF_2$, the fluoropolymer is free of iodide containing end groups.

Still further, the present invention also provides a fluoropolymer composition for making a fluoroelastomer, comprising the above fluoropolymer and a cure composition.

The invention also provides the use of a chloride salt in the initiation of a free radical polymerization of one or more fluorinated monomers to improve the processibility and/or heat resistance of the fluoropolymer resulting from said free radical polymerization.

DETAILED DESCRIPTION OF THE INVENTION

In accordance with the process of the invention, a chloride salt is used in the initiation of the free radical polymerization of fluorinated monomers to obtain a fluoropolymer with a reduced amount of polar end groups. Suitable chloride salts for use in the invention include those of the formula:

$$M Cl_n \qquad (I)$$

wherein M represents a mono- or multi-valent cation and n corresponds to the valence of the cation. Suitable cations M include organic and inorganic cations. Particularly useful cations are ammonium and metal cations including monovalent cations such as sodium and potassium as well as divalent cations such as calcium and magnesium. Examples of ammonium chloride salts include tetraalkyl ammonium chlorides such as tetrabutyl ammonium chloride.

The amount of chloride salt is selected relative to the amount of the polymerization initiator so that the amount of polar end groups is reduced by at least 10%, preferably at least 15% and most preferably at least 20%. In a particular preferred embodiment of the invention, the total amount acid groups and their salts in the fluoropolymer is not more than 0.1, preferably not more than 0.09 milli equivalents NaOH per gram of fluoropolymer. Generally, the amount of polar end groups decreases with an increase in the ratio of the amount of chloride salt to the amount of polymerization initiator. Typically, the molar ratio of chloride ions to initiator is between 1:0.1 and 0.1:10, preferably between 1:0.5 and 0.1:5.

The free radical polymerization is generally initiated through the use of free radical generating initiators. As initiators, one can use any of the known initiators commonly employed in the polymerization of fluorinated olefins such as tetrafluoroethylene. For example peroxides can be used as free radical initiators. Specific examples of peroxide initiators include, hydrogen peroxide, sodium or barium peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azocompounds. Suitable redox systems for use as initiators include for example a combination of peroxodisulphate and hydrogen sulphite or disulphite, a combination of thiosulphate and peroxodisulphate, a combination of peroxodisulphate and hydrazine or azodicarboxamide (including salts thereof, preferably alkali or ammonium salts). Further initiators that can be used are ammonium-alkali- or earth alkali salts of permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization. Preferred initiator systems include peroxodisulphate and permanganate.

The free radical polymerization may be carried out in an organic solvent, can be a aqueous suspension polymerization or an aqueous emulsion polymerization. An aqueous emulsion polymerization is preferred in the present invention.

In the aqueous emulsion polymerization, the fluorinated monomers and optionally further non-fluorinated monomers are polymerized in the aqueous phase generally in the presence of a free radical initiator and a fluorinated surfactant or emulsifier, preferably a non-telogenic emulsifier. The emulsifier will generally be used in amounts less than 1% by weight, for example from 0.1 to 1% by weight based on the weight of the aqueous phase. Examples of fluorinated emulsifiers include salts, in particular ammonium salts of linear or branched perfluoro alkyl containing carboxylic and sulphonic acids having 4 to 11 carbon atoms in the alkyl chain. Specific examples include perfluorooctanoic acid ammonium salt (APFO, described in U.S. Pat. No. 2,567,011) $C_8F_{17}SO_3Li$ which is commercially available from Bayer AG, $C_4F_9SO_3Li$ and $C_4F_9SO_3K$ (described in U.S. Pat. No. 2,732,398). A further example of a perfluoroalkyl containing carboxylic acid salt is $C_8F_{17}SO_2N(C_2H_5)CH_2COOK$ (described in U.S. Pat. No. 2,809,990).

Still further emulsifiers that can be used include perfluoropolyethercarboxylate emulsifiers such as disclosed in EP 219065. However, APFO is the preferred emulsifier as it can be more readily removed from the polymerization product at the end of polymerization.

The aqueous emulsion polymerization may also be carried out without addition of a fluorinated emulsifier. Such a polymerization is for example described in WO 96/24622 and WO 97/17381.

The aqueous emulsion polymerization can be carried out continuously in which, for example, monomers, water, optionally further emulsifiers, buffers and catalysts are fed continuously to a stirred reactor under optimum pressure and temperature conditions while the resulting emulsion or suspension is removed continuously. An alternative technique is batch or semibatch (semi-continuous) polymerization by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

The polymerization systems may comprise auxiliaries, such as buffers and, if desired, complex-formers or chain-transfer agents including for example alkanes such ethane and n-pentane, dialkyl ethers such as dimethyl ether, methyl tertiary butyl ether and chlorine or bromine containing chain transfer agents. The polymerization temperature may be from 10 to 180° C., typically 30° C. to 100° C. Polymerization pressures may be from 1 to 40 bar, typically 3 to 30 bar.

The fluoropolymer may have a partially or fully fluorinated backbone. Particularly preferred fluoropolymers are those that have a backbone that is at least 30% by weight fluorinated, preferably at least 50% by weight fluorinated, more preferably at least 65% by weight fluorinated. In a particular embodiment, the fluoropolymer will be free of iodide containing end groups.

Examples of fluoropolymers for use in this invention include polymers of one or more fluorinated monomers optionally in combination with one or more non-fluorinated monomers. Examples of fluorinated monomers include fluorinated $C_2$–$C_8$ olefins that may have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers. Suitable non-fluorinated comonomers include vinyl chloride, vinylidene chloride and $C_2$–$C_8$ olefins such as ethylene (E) and propylene (P).

Examples of perfluorovinyl ethers that can be used in the invention include those that correspond to the formula:

$$CF_2=CF-O-R_f$$

wherein $R_f$ represents a perfluorinated aliphatic group that may contain one or more oxygen atoms.

Particularly preferred perfluorinated vinyl ethers correspond to the formula:

$$CF_2=CFO(R^a_fO)_n(R^b_fO)_mR^c_f$$

wherein $R^a_f$ and $R^b_f$ are different linear or branched perfluoroalkylene groups of 1–6 carbon atoms, in particular 2 to 6 carbon atoms, m and n are independently 0–10 and $R^c_f$ is a perfluoroalkyl group of 1–6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

Suitable perfluoroalkyl vinyl monomers correspond to the general formula:

$$CF_2=CF-R^d_f$$

or $$CH_2=CH-R^d_f$$

wherein $R^d_f$ represents a perfluoroalkyl group of 1 to 10, preferably 1 to 5 carbon atoms. A typical example of a perfluoroalkyl vinyl monomer is hexafluoropropylene.

According to a particular embodiment, the fluoropolymer is a polymer suitable for making a fluoroelastomer. Generally suitable fluoropolymers, including partially as well as perfluorinated polymers, for making a fluoroelastomer are substantially amorphous polymers that show hardly any melting point if at all. Such fluoropolymers are particularly suitable for providing fluoroelastomers, which are typically obtained upon curing of an amorphous fluoropolymer. Amorphous fluoropolymers include for example copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Specific examples of copolymers include for example copolymers having a combination of monomers as follows: VDF-HFP, TFE-P, VDF-TFE-HFP, VDF-TFE-PVE, TFE-PVE, E-TFE-PVE and any of the aforementioned copolymers further including units derived from a chlorine containing monomer such as CTFE. Still further examples of suitable amorphous copolymers include copolymers having a combination of monomers as in CTFE-P.

Preferred amorphous fluoropolymers generally comprise from 20 to 85%, preferably 50 to 80% by moles of repeating units derived from VDF, TFE and/or CTFE, copolymerized with one or more other fluorinated ethylenically unsaturated monomer and/or one or more non fluorinated $C_2$–$C_8$ olefins, such as ethylene and propylene. The units derived from the fluorinated ethylenically unsaturated comonomer when present is generally between 5 and 45 mole %, preferably between 10 and 35 mole %. The amount of non-fluorinated comonomer when present is generally between 0 and 50 mole %, preferably between 1 and 30 mole %.

In an embodiment where a fluoroelastomer is desired, the fluoropolymer will typically be cured. The fluoropolymer may be cured by any of the methods known to those skilled in the art and will typically include a cure composition such that the fluoropolymer composition can be cured to a fluoroelastomer. The cure composition typically includes one or more components that cause the fluoropolymer chains to link with each other thereby forming a three dimensional network. Such components may include catalysts, curing agents and/or coagents.

In one embodiment of curing the fluoropolymer a so called peroxide cure system may be used. In a typical peroxide cure system, the fluoropolymer is provided with one or more cure sites that comprise a halogen capable of participating in a peroxide cure reaction and the composition for providing the fluoropolymer contains an organic peroxide. The halogen capable of participating in a peroxide cure reaction is typically bromine or iodine and may be distributed along the polymer chain and/or may be contained in the end groups of the fluoropolymer. Typically, the amount of bromine or iodine contained in the fluoropolymer is between 0.001 and 5%, preferably between 0.01 and 2.5%, by weight with respect to the total weight of the fluoropolymer. It has further been found that also chlorine is capable of participating in a peroxide cure reaction of the fluoropolymer if an organic compound having MH functions as described above is present. Accordingly, also fluoropolymers that contain chlorine atoms and/or bromine or iodine can be used for curing in a peroxide cure reaction. The amount of chlorine in the fluoropolymer may vary from 0.001% by weight to 10% by weight but is typically between 0.01% by weight and 5% by weight based on the weight of fluoropolymer. A particularly suitable polymer for use with a peroxide cure system is a polymer that includes units that are derived from CTFE or another chlorine containing monomer. Specific examples include copolymers that have a combination of CTFE-VDF-TFE-HFP as monomers. Of course a chlorine containing fluoropolymer for use in a peroxide cure system may additionally be modified with bromine and/or iodine. The fluoropolymer for use in the peroxide cure reaction typically will have a molecular weight of $10^4$ to $5 \times 10^5$ g/mol and the molecular weight distribution can be monomodal as well as bimodal or multimodal.

In order to introduce halogens, which are capable of participation in the peroxide cure reaction, along the chain, the copolymerization of the basic monomers of the fluoropolymer is carried out with a suitable fluorinated cure-site monomer (see for instance U.S. Pat. Nos. 4,745,165, 4,831,085, and 4,214,060). Such comonomer can be selected for instance from:

(a) bromo- or iodo- (per)fluoroalkyl-perfluorovinylethers having the formula:

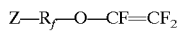

wherein Z is Br or I, $R_f$ is a (per)fluoroalkylene $C_1$–$C_{12}$, optionally containing chlorine and/or ether oxygen atoms; for example: $BrCF_2$—O—CF=$CF_2$, $BrCF_2CF_2$—O—CF=$CF_2$, $BrCF_2CF_2CF_2$—O—CF=$CF_2$, $CF_3CFBrCF_2$—O—CF=$CF_2$, and the like;

(b) bromo- or iodo (per)fluoroolefins such as those having the formula:

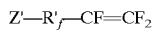

wherein Z' is Br or I, $R'_f$ is a (per)fluoroalkylene $C_1$–$C_{12}$, optionally containing chlorine atoms; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1;

(c) non-fluorinated bromo-olefins such as vinyl bromide and 4-bromo-1-butene;

(d) chlorine containing monomers including chlorine containing fluorinated monomers such as for example chlorine containing fluorinated $C_2$–$C_8$ olefins such as CTFE and non-fluorinated chlorine containing monomers such as chlorinated $C_2$–$C_8$ olefins such as vinyl chloride and vinylidene chloride.

In replacement of or in addition to the cure site comonomer, the fluoropolymer can contain a cure site component in terminal position, deriving from a suitable chain transfer agent introduced in the reaction medium during the polymer preparation, as described in U.S. Pat. No. 4,501,869 or derived from a suitable initiator. Examples of useful initiators include $X(CF_2)_nSO_2Na$ with n=1 to 10 (where X is Br or I) or an initiator composition comprising ammonium persulfate and potassium bromide. The chlorine of the $CF_2Cl$ end groups introduced with the presence of the chloride salt in the initiation of the free radical polymerization can also participate in a peroxide cure reaction.

Examples of chain transfer agents include those having the formula $R_fBr_x$, wherein $R_f$ is a x-valent (per)fluoroalkyl radical $C_1$–$C_{12}$, optionally containing chlorine atoms, while x is 1 or 2. Examples include $CF_2Br_2$, $Br(CF_2)_2Br$, $Br(CF_2)_4Br$, $CF_2ClBr$, $CF_3CFBrCF_2Br$ and the like. Further examples of suitable chain transfer agents include $CH_2Br_2$ and those disclosed in U.S. Pat. No. 4,000,356.

Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts of peroxide per 100 parts of fluoropolymer is used.

The cure site component may also comprise a nitrile group containing cure site monomer. Preferred useful nitrile group containing cure site monomers include nitrile-containing fluorinated olefins and nitrile-containing fluorinated vinyl ethers, such as depicted below:

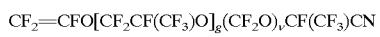

where, in reference to the above formulas: l=2–12; g=0–4; k=1–2; v=0–6; and u=1–4, $R_f$ is a perfluoroalkylene or a bivalent perfluoroether group. Representative examples of such a monomer include perfluoro(8-cyano-5-methyl-3,6-dioxa-1-octene), $CF_2$=CFO$(CF_2)_5$CN, and $CF_2$=CFO$(CF_2)_3$OCF$(CF_3)$CN.

When the fluoropolymer includes a nitrile containing cure site component, a catalyst comprising one or more ammonia-generating compounds may be used to cause curing. "Ammonia-generating compounds" include compounds that are solid or liquid at ambient conditions but that generate ammonia under conditions of cure. Such compounds include, for example, hexamethylene tetramine (urotropin), dicyan diamid, and metal-containing compounds of the formula:

where $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and v is an integer from 1 to about 7.

Also useful as ammonia-generating compounds are substituted and unsubstituted triazine derivatives such as those of the formula:

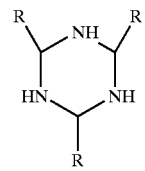

wherein R is a hydrogen or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The fluoropolymers including a nitrile containing cure site component can also be cured using one or more peroxide curatives along with the ammonia generating catalysts. Suitable peroxide curatives for this purpose include those listed above. It will further be understood by one skilled in the art that the curable fluoroelastomer may include a mixture of cure site components, such as a mixture of nitrile containing cure sites and cure sites including a halogen capable of participating in a peroxide cure reaction. In the latter case, a mixture of ammonia generating compounds and peroxides will generally be employed.

To cure the nitrile containing fluoropolymers all other well-known compounds can be used, like amino phenols (U.S. Pat. No. 5,677,389), ammonia salts (U.S. Pat. No. 5,565,512), amidoximes (U.S. Pat. No. 5,668,221) and other ammonia generating comp (PCT 00/09603) or imidates.

Another component which is usually included in a cure composition based on an organic peroxide and/or nitrile containing cure site component, is a coagent composed of a polyunsaturated compound, which is capable of cooperating with the peroxide to provide a useful cure. These coagents can be added in an amount equal to 0.1 and 10 parts per hundred parts fluoropolymer, preferably between 2–5 parts per hundred parts fluoropolymer. Examples of useful coagents include triallyl cyanurate; triallyl isocyanurate; triallyl trimellitate; tri(methylallyl) isocyanurate; tris(diallylamine)-s-triazine; triallyl phosphite; N,N-diallyl acrylamide;

hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

According to a further embodiment, the curing of the fluoropolymer may be effected using a polyhydroxy compound and the cure composition will thus comprise a polyhydroxy compound. The advantage of using a polyhydroxy compound for curing the fluoropolymer is that it will not be necessary to include special cure site components in the fluoropolymer. In addition to the polyhydroxy compound, a polyhydroxy curing system generally also comprises one or more organo-onium accelerators in addition to the polyhydroxy compound. The organo-onium compounds useful in the present invention typically contain at least one heteroatom, i.e., a non-carbon atom such as N, P, S, O, bonded to organic or inorganic moieties and include for example ammonium salts, phosphonium salts and iminium salts. One class of quaternary organo-onium compounds useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169, all of whose descriptions are herein incorporated by reference. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo [5,4,0]-7-undecenium chloride
benzyl tris(dimethylamino) phosphonium chloride
benzyl(diethylamino)diphenylphosphonium chloride Another class of useful organo-onium compounds include those having one or more pendent fluorinated alkyl groups. Generally, the most useful fluorinated onium compounds are disclosed by Coggio et al. in U.S. Pat. No. 5,591,804.

The polyhydroxy compound may be used in its free or non-salt form or as the anionic portion of a chosen organo-onium accelerator. The crosslinking agent may be any of those polyhydroxy compounds known in the art to function as a crosslinking agent or co-curative for fluoropolymers, such as those polyhydroxy compounds disclosed in U.S. Pat. No. 3,876,654 (Pattison), and U.S. Pat. No. 4,233,421 (Worm). One of the most useful and commonly employed aromatic polyphenols is 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

The cure composition based on polyhydroxy compounds may further include an acid acceptor. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoropolymer.

In a further embodiment of the invention, the cure composition may comprise an organic peroxide and a polyhydroxy based cure system as described above. Such cure composition can be used with a fluoropolymer that has a halogen capable of participating in a peroxide cure reaction as well as with fluoropolymers that do not contain such halogens. If the fluoropolymer has halogens capable of participating in the peroxide cure reaction, a cure composition having a polyhydroxy compound and a peroxide can provide for a so called dual cure. The use of an organic peroxide in the cure composition is particularly beneficial if the fluoropolymer is to form a fluoroelastomer layer bonded to another elastomer that is also formed with the use of a peroxide cure system such as for example in case of a silicone based elastomer.

The fluoropolymer composition may contain further additives, such as carbon black, stabilizers, plasticizers, lubricants, fillers, and processing aids typically utilized in fluoropolymer compounding can be incorporated into the compositions of the present invention, provided they have adequate stability for the intended service conditions.

The fluoropolymer compositions may be prepared by mixing a fluoropolymer, a cure composition and the organic compound having hydride function(s) and other additives in conventional rubber processing equipment. Such equipment includes rubber mills, internal mixers, such as Banbury mixers, and mixing extruders.

In a further embodiment of the present invention, the fluoropolymer comprises a thermoplastic fluoropolymer, in particular a melt processible thermoplastic fluoropolymer. By the term "thermoplastic fluoropolymer" is meant a fluoropolymer that is at least partially crystalline such that a distinct melting point, typically 100° C. or more, can be identified for example through a DSC scan of the polymer. By the term "melt processible" is meant that the fluoropolymer has a melt viscosity such that it can be processed from the melt through typical melt extrusion equipment that is available. Specific examples of thermoplastic fluoropolymers that may be used with this invention are copolymers having the following combination of monomers: CTFE-VDF; CTFE-TFE, CTFE-TFE-HFP, CTFE-TFE-HFP-VDF; CTFE-TFE-HFP-VDF-PPVE, CTFE-TFE-E; TFE-HFP; TFE-VDF-HFP, TFE-P; TFE-PVE; bromine or chlorine containing E-TFE copolymers and bromine or chlorine containing TFE-HFP-VDF copolymers.

As mentioned above, the fluoropolymer has improved bonding properties to other substrates, particularly in the presence of an organic compound having hydride functions MH. Additionally, by including this compound in the fluoropolymer composition, a peroxide curable fluoropolymer composition can be obtained. Examples of the organic compound include siloxanes or silazenes that comprise one or more MH functions. Typically, when the organic compound is a siloxane or a silazene, the MH functions will be —SiH functions. Preferably, the SiH function will be an —OSiH or a —NSiH whereby the hydrogen is attached to a silicon atom that is further bonded to an oxygen or nitrogen atom. The siloxane of silazene may be a simple low molecular weight organic compound or may be a polymeric compound including for example a polysiloxane which may be linear, branched or cyclic. Specific examples include HSi(OCH$_2$CH$_3$)$_3$, (CH$_3$)$_2$(CH$_3$CH$_2$O)SiH, 1,1,3,3 tetraisopropyl disiloxane, diphenyl-1,1,3,3-tetrakis(dimethylsiloxy) disiloxane available from United Chem, silylhydride terminated poly(dimethylsiloxane), poly(methyl hydro siloxane) and copolymers of dimethylsiloxane and methylhydrosiloxane, 1,3,5-trimethyl cyclosiloxane and 1-phenyl-3,3,5,5-tetramethyl cyclosiloxane. Polysiloxanes and siloxanes having SiH groups are known in the art and can be produced according to well-known procedures such as disclosed in for example: Encyclopedia of Polymer Science and Engineering, Second Edition, V15, Silicones, pgs. 204–308, John Wiley & Sons, 1989. Siloxanes having SiH groups are also generally commercially available. Preferably, the siloxane or polysiloxane will have a molecular weight between 150 g/mol and 10000 g/mol.

The organic compound may also be a compound that corresponds to the formula:

(II)

wherein R represents a hydrocarbon group optionally comprising one or more substituents and wherein the R groups may be the same or different and whereby two R groups may be linked to each other so as to form a ring, M is selected from Si, Ge, Sn and Pb, q is a value of 1 to 3, x is a value of 1 to 3, y and z represent a value of 0 to 3 and the sum of y+z=4−x. Examples of substituents that may be present on the hydrocarbon group R include alkoxy, aryloxy, halogens such as chlorine and bromine, nitrile groups, hydroxy groups and amino groups. The backbone of the hydrocarbon group may further be interrupted by one or more heteroatoms such as for example oxygen and nitrogen atoms. Typical examples of hydrocarbon groups include saturated or unsaturated linear, branched or cyclic aliphatic groups and aromatic groups. Specific examples are C$_1$–C$_5$ alkyl groups, aryl groups having 6 to 12 carbon atoms, arylalkyl and alkylaryl groups having 7 to 14 carbon atoms. Compounds of formula (II) above are known and have been described in for example J. Am. Chem. Soc., 116 (1994), page 4521–4522. Examples include tri(n-butyl)tin hydride, tri(ethyl)silyl hydride, di(trimethylsilyl)silylmethyl hydride, tri(trimethylsilyl)silyl hydride, tri(phenyl)silyl hydride. Compounds of formula (II) have further been disclosed in EP 761 735.

The invention is further illustrated with reference to the following examples, without however the intention to limit the invention thereto. All parts are by weight unless indicated otherwise.

EXAMPLES

Test Methods

Determination of the Absorbance Ratio

To quantify the amount of carbonyl end groups, a Fourier transform infrared spectrum of the fluoropolymer was made and the absorbance ratio of the peak area (1840 cm$^{-1}$–1620 cm$^{-1}$) versus the peak area (2740 cm$^{-1}$–2220 cm$^{-1}$) was calculated from this spectrum.

Determination of Amount of Acid Groups and Their Salts

The determination of acid end groups and their salts (titratable end groups) was determined by means of latex ph-titration. Prior to titration, a non-ionic surfactant TRI-TON® X-100 was added in an amount of 5% by weight based on dry solids to the latex and the latex was then treated three times with DOWEX® MR-3 mixed bed ion exchange resin (commercially available from Aldrich Chem.) to remove residual inorganic salt impurities. The thus purified latex is present in the acid form (the pH value is in the order of 2.5). 15 g of this latex dispersion was titrated twice in an automated Titrino® 716-DMS device from Metron with 0.01 mol/l NaOH solution to the neutralization point. The neutralization point was determined automatically by the instrument software from the maximum of the 1st derivative of the pH titration curve. Finally, the number of titratable endgroups relates to the average value of molar NaOH consumption (given in milli equivalents; meq) per gram of polymer (meq/g).

Mooney Viscosity

The Mooney viscosity values were measured according to ASTM D 1646.

Example 1

A 4 liter kettle was charged with 2.81 O$_2$-free water, 15 g C$_7$F$_{15}$COONH$_4$ and 2 g KCl. At 73° C., 8 g ammonium persulfate (APS) was added and at 12 bar 620 g TFE, 680 g perfluoromethylvinyl ether (PMVE) and 55 g CF$_2$=CF—O—(CF$_2$)$_5$CN (preemulsified within an aqueous C$_7$F$_{15}$COONH$_4$-solution) were added over 360 min. The resulting latex was coagulated with MgCl$_2$ and the polymer was dried at 120° C. under vacuum.

The resulting polymer (TFE 65.1 mol-%, 33.5 Mol-% PMVE, nitrile vinylether content 1.4 mol-%) showed a Mooney value ML 1+10 121° C. of 40, an absorbance ratio of 0.2 and an amount of titratable end groups of 0.09 meq/g.

Examples 2 and 3

Examples 2 and 3 were carried out according to the general procedure of Example 1. In example 2 (comparative), no chloride salt was used and in example 3 3.0 g of KCl was used as the chloride salt. The result are listed below in Table 1.

|  | Ex 2 (comparative) | Ex 3 |
|---|---|---|
| Added KCl (g) | — | 3.0 |
| Polymeriz. Temp. (° C.) | 73 | 73 |
| Polymeriz. Pressure (bar) | 14 | 14 |
| APS (g) | 6 | 6 |
| Feeded Monomers |  |  |
| TFE | 540 | 720 |
| PMVE | 670 | 820 |
| Nitrile Vinylether | 55 | 60 |
| Reaction time (min) | 280 | 330 |
| Measured Comp. |  |  |
| TFE | 64.2 | 63.2 |
| PMVE | 34.1 | 35.5 |
| Nitrile vinylether | 1.7 | 1.3 |
| Mooney | 60 | 100 |
| Content of carbonyl end groups (absorbance ratio) | 0.25 | 0.12 |
| titratable end groups (meq/g) | 0.12 | 0.06 |

Example 4

A 4 liter kettle was charged with 3.11 O$_2$-free water, 15 g C$_7$F$_{15}$COONH$_4$ (APFO) and 0.7 g KCl. Additionally 150 g TFE, 110 g PMVE, 4 g bromotrifluoroethylene (BTFE) and 200 g MV 31 ($CF_2=CF-O-(CF_2)_3-O-CF_3$) preemulsified in $H_2O$/APFO were added to the kettle.

At 50° C. and 9 bar pressure in total 600 g TFE, 590 g MV31 (preemulsified), 180 g PMVE and 9 g BTFE were fed over a period of 300 min. The polymerization was initiated with $KMnO_4$ (2.4 g).

The isolated polymer (70 mol-% TFE, 19 mol-% MV31, 10.6 mol-% PMVE, 0.6 mol-% BTFE) had a Mooney viscosity MC 1+10 121° C. of 120, an absorbance ratio of 0.03 and an amount of titratable end groups of 0.014 meq/g.

Example 5

Example 4 was repeated with the exception that 1 g KCl was used. The $KMnO_4$-consumption was 2.9 g and the polymerization run time was 240 min.

The isolated polymer (with the identical composition) had a Mooney viscosity of 40, an absorbance ratio of 0.07 and an amount of titratable end groups of 0.03 meq/g.

Example 6

Example 4 was repeated but without any KCl. The $KMnO_4$-consumption was 0.9 g and the polymerization run time was 300 min. The isolated polymer had a Mooney viscosity of 60, an absorbance ratio of 0.1 and an amount of titratable end groups of 0.04 meq/g.

What is claimed is:

1. Process for preparing a fluoropolymer comprising a free radical polymerization of one or more fluorinated monomers, said free radical polymerization being initiated with an initiator in the presence of a chloride salt and whereby the ratio of said chloride salt to said initiator is selected such that the resulting fluoropolymer has at least 10% less polar end groups relative to a similar fluoropolymer produced in absence of a chloride salt, with the proviso that when said one or more fluorinated monomers consist of a mixture of tetrafluoroethylene, hexafluoropropylene and $C_3F_7[(CF_2)_3O]_2CF=CF_2$, the free radical polymerization is carried out in the absence of $I(CF_2)_4I$.

2. Process according to claim 1 wherein the ratio of chloride salt to said initiator is selected such that the resulting fluoropolymer is free of acid groups and salts thereof or the amount of said acid groups and their salts is not more than 0.1 milli equivalents NaOH per gram of fluoropolymer.

3. Process according to claim 1 wherein said fluoropolymer is a fluoropolymer suitable for the preparation of a fluoroelastomer.

4. Process according to claim 1 wherein said fluoropolymer is a melt processable thermoplastic fluoropolymer having a melting point of at least 100° C.

5. Process according to claim 1 wherein said fluoropolymer is a perfluoropolymer.

6. Process according to claim 1 wherein at least one of said fluorinated monomers is selected from the group consisting of tetrafluoroethylene, hexafluoropropylene, vinylidene fluoride, chlorotrifluoroethylene, fluorinated vinyl ethers, fluorinated allyl ethers and mixtures thereof.

7. Process according to claim 1 wherein said one or more fluorinated monomers comprise at least one cure site monomer.

8. Process according to claim 1 wherein said chloride salt is a metal chloride or an ammonium chloride.

9. Fluoropolymer comprising $CF_2Cl$ end groups and being fee of acid groups and salts thereof or having said acid groups and their salts in an amount of not more than 0.1 milli equivalents NaOH per gram fluoropolymer, with the proviso that when said fluoropolymer is a terpolymer of tetrafluoroethylene, hexafluoropropylene and $C_3F_7[(CF_2)_3O]_2CF=CF_2$, the fluoropolymer is free of iodide containing end groups.

10. Fluoropolymer composition for preparing a fluoroelastomer, said composition comprising a fluoropolymer as defined in claim 9 and a cure composition.

11. Method of utilizing a chloride salt in the initiation of a free radical polymerization of one or more fluorinated monomers to improve the processibility and/or heat resistance of the fluoropolymer resulting from said free radical polymerization.

* * * * *

UNITED STATES PATENT AND TRADEMARK OFFICE
CERTIFICATE OF CORRECTION

PATENT NO. : 6,812,310 B2
DATED : November 2, 2004
INVENTOR(S) : Grootaert, Werner M. A.

It is certified that error appears in the above-identified patent and that said Letters Patent is hereby corrected as shown below:

Column 3,
Line 54, "azocompounds" should be shown as -- azo-compounds --

Column 7,
Line 65, "$CF_2=CFO(CF_2)_l,CN$" should be shown as -- $CF_2=CFO(CF_2)_lCN$ --

Column 11,
Line 67, "ph-titration" should be shown as -- pH-titration --

Column 14,
Line 25, "fee" should be shown as -- free --

Signed and Sealed this

Twelfth Day of April, 2005

JON W. DUDAS
*Director of the United States Patent and Trademark Office*